United States Patent
Luo et al.

(10) Patent No.: US 12,463,544 B2
(45) Date of Patent: Nov. 4, 2025

(54) POWER SUPPLY HAVING ORING MOSFETS

(71) Applicant: ACBEL POLYTECH INC., New Taipei (TW)

(72) Inventors: Cheng-Hsiao Luo, New Taipei (TW); I-Hsiu Lo, New Taipei (TW)

(73) Assignee: ACBEL POLYTECH INC., New Taipei (TW)

(*) Notice: Subject to any disclaimer, the term of this patent is extended or adjusted under 35 U.S.C. 154(b) by 208 days.

(21) Appl. No.: 18/388,197

(22) Filed: Nov. 9, 2023

(65) Prior Publication Data

US 2025/0023440 A1     Jan. 16, 2025

(30) Foreign Application Priority Data

Jul. 12, 2023    (TW) ................. 112126072

(51) Int. Cl.
*H02M 3/335* (2006.01)
*H02M 1/00* (2006.01)
*H02M 1/088* (2006.01)

(52) U.S. Cl.
CPC ..... *H02M 3/33576* (2013.01); *H02M 1/0006* (2021.05); *H02M 1/088* (2013.01); *H02M 3/33507* (2013.01); *H02M 3/33561* (2013.01); *H02M 3/33573* (2021.05)

(58) Field of Classification Search
CPC .............. H02M 1/0006; H02M 1/088; H02M 3/33576; H02M 3/33507; H02M 3/33561; H02M 3/33573
See application file for complete search history.

(56) References Cited

U.S. PATENT DOCUMENTS

| | | | | |
|---|---|---|---|---|
| 5,731,692 A | * | 3/1998 | Garcia | H02M 3/33507 323/280 |
| 6,128,203 A | * | 10/2000 | Canizales Teran | H02M 3/33592 363/67 |
| 6,262,901 B1 | * | 7/2001 | Simopoulos | H02J 1/102 363/72 |
| 6,628,532 B1 | * | 9/2003 | Rinne | H02M 1/34 363/21.06 |
| 8,593,767 B2 | * | 11/2013 | Wu | H02H 7/1206 361/18 |
| 8,885,308 B2 | * | 11/2014 | Waltman | H02M 3/156 361/90 |
| 9,785,127 B2 | | 10/2017 | Park | |
| 10,170,973 B1 | * | 1/2019 | Hirose | H02M 3/33592 |
| 10,992,131 B2 | * | 4/2021 | Fukuhara | H02J 1/106 |
| 11,596,040 B1 | * | 2/2023 | Xiong | H05B 45/14 |

(Continued)

FOREIGN PATENT DOCUMENTS

| | | |
|---|---|---|
| TW | M455287 U | 6/2013 |
| TW | 201907651 A | 2/2019 |
| TW | 201947861 A | 12/2019 |

*Primary Examiner* — Yusef A Ahmed
(74) *Attorney, Agent, or Firm* — WPAT, PC (57) ABSTRACT

A power supply having ORing MOSFETs mounts a voltage regulating unit between a main power module and an auxiliary power module of a secondary side of the power supply. The voltage regulating unit regulates a control voltage received by a driving unit, such that a voltage difference between a gate voltage and a source voltage of one of the ORing MOSFETs can be less than a rated voltage threshold for avoiding damaging the one ORing MOSFET.

6 Claims, 8 Drawing Sheets

(56) References Cited

U.S. PATENT DOCUMENTS

| | | | |
|---|---|---|---|
| 2004/0170031 A1* | 9/2004 | Tomiyama | H02M 3/3385 363/21.16 |
| 2006/0103237 A1* | 5/2006 | Uemura | H02M 7/217 307/1 |
| 2006/0279967 A1* | 12/2006 | Shao | H02M 3/33592 363/21.01 |
| 2007/0041221 A1* | 2/2007 | Phadke | H02M 3/33576 363/16 |
| 2009/0052211 A1* | 2/2009 | Asai | H02M 7/5387 363/56.05 |
| 2009/0207634 A1* | 8/2009 | Zhao | H02M 3/335 363/17 |
| 2011/0102951 A1* | 5/2011 | Wu | H02H 7/1206 361/18 |
| 2011/0107122 A1* | 5/2011 | Wang | H02M 3/33507 713/300 |
| 2011/0222313 A1* | 9/2011 | Ueno | H02M 1/36 363/15 |
| 2012/0256491 A1* | 10/2012 | Ryu | H02J 9/061 307/64 |
| 2012/0306461 A1* | 12/2012 | Gong | H02M 1/36 323/234 |
| 2018/0026523 A1* | 1/2018 | Nate | H05B 45/10 318/504 |
| 2018/0034378 A1* | 2/2018 | Lin | H02M 1/08 |
| 2020/0153350 A1* | 5/2020 | Yoshimitsu | H02M 3/33592 |
| 2023/0231485 A1* | 7/2023 | Yang | H02M 3/285 363/17 |
| 2024/0405689 A1* | 12/2024 | Yang | H02M 1/0054 |

* cited by examiner

POWER SUPPLY HAVING ORING MOSFETS

BACKGROUND OF THE INVENTION

1. Field of the Invention

The present invention relates to a power supply, especially a power supply having ORing Metal-Oxide-Semiconductor Field-Effect Transistors (MOSFETs).

2. Description of the Related Art

When a conventional power supply having ORing MOSFETs is in use, sometimes a voltage between a gate and a source of one of the ORing MOSFETs may exceed a rated voltage, causing damage.

Figure 7:
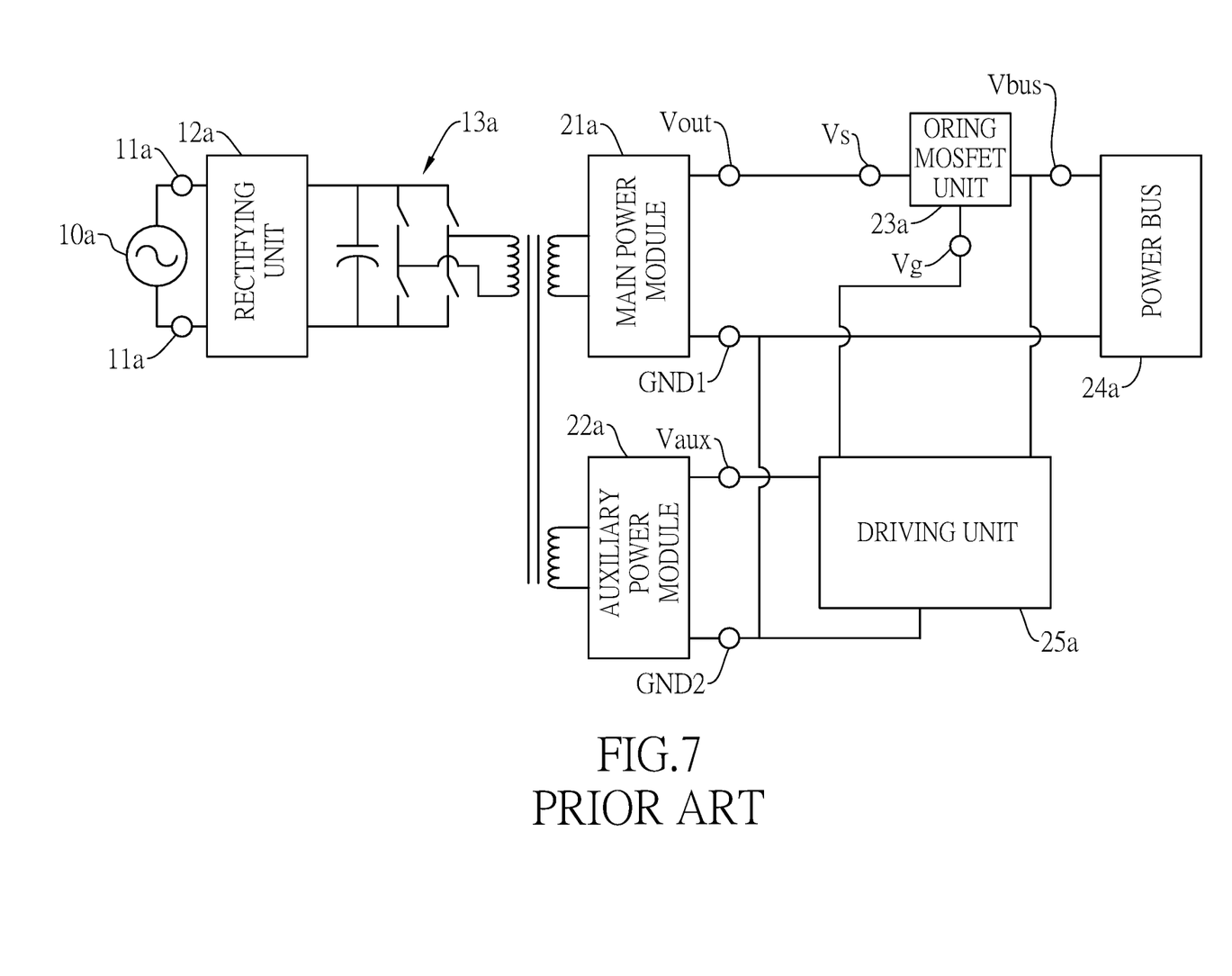
FIG. 7 is a system architecture diagram of a conventional power supply having ORing MOSFETs.

With reference to FIG. 7, the conventional power supply having the ORing MOSFETs includes an input port 11a, a rectifying unit 12a, a primary side module 13a, a main power module 21a, an auxiliary power module 22a, an ORing MOSFET unit 23a, a power bus 24a, and a driving unit 25a.

The input port 11a is adapted to be electrically connected to a power 10a for receiving an alternating current (AC). The rectifying unit 12a is electrically connected to the input port 11a for receiving the AC, and rectifies the AC to a direct current (DC). The primary side module 13a is electrically connected to the rectifying unit 12a for receiving the DC.

The main power module 21a is coupled with the primary side module 13a to induce a main voltage, and the auxiliary power module 22a is coupled with the primary side module 13a to induce an auxiliary voltage. The main power module 21a further includes a main output terminal Vout and a main ground terminal GND1, and the main output terminal Vout outputs the main voltage. The auxiliary power module 22s includes an auxiliary output terminal Vaux and an auxiliary ground terminal GND2, and the auxiliary output terminal Vaux outputs the auxiliary voltage. The auxiliary ground terminal GND2 is electrically connected to the main ground terminal GND1.

The ORing MOSFET unit 23a includes a unit source Vs, a unit gate Vg, and a unit drain Vbus. The unit source Vs is electrically connected to the main output terminal Vout of the main power module 21a for receiving the main voltage. The power bus 24a is electrically connected to the unit drain Vbus of the ORing MOSFET unit 23a and the main ground terminal GND1 of the main power module 21a.

The driving unit 25a includes a first driving input terminal, a second driving input terminal, a driving output terminal, and a voltage control terminal.

The first driving input terminal and the second driving input terminal are respectively electrically connected to the unit source Vs and the unit drain Vbus of the ORing MOSFET unit 23a. The driving output terminal is electrically connected to the unit gate Vg of the ORing MOSFET unit 23a. The voltage control terminal is electrically connected to the auxiliary output terminal Vaux of the auxiliary power module 22a. The driving unit 25a controls a gate voltage of the unit gate Vg according to a source voltage of the unit source Vs, a drain voltage of the unit drain Vbus, and a control voltage of the voltage control terminal.

Since the control voltage of the voltage control terminal is provided by the auxiliary power module 22a, the gate voltage of the unit gate Vg will correspond to the auxiliary voltage of the auxiliary power module 22a.

However, when the conventional power supply is powered and the auxiliary power module 22a is firstly turned on, or when a short-circuit protection experiment is performed on the main output terminal Vout of the main power module 21a after the conventional power supply is normally started, the main output terminal Vout of the main power module 21a will be grounding, such that a voltage of the main output terminal Vout will be 0 volt. But the auxiliary output Vaux of the auxiliary power module 22a is normally working, causing damage to the ORing MOSFET unit 23a because of an excessive voltage difference between the unit gate Vg and the unit source Vs.

Figure 8:
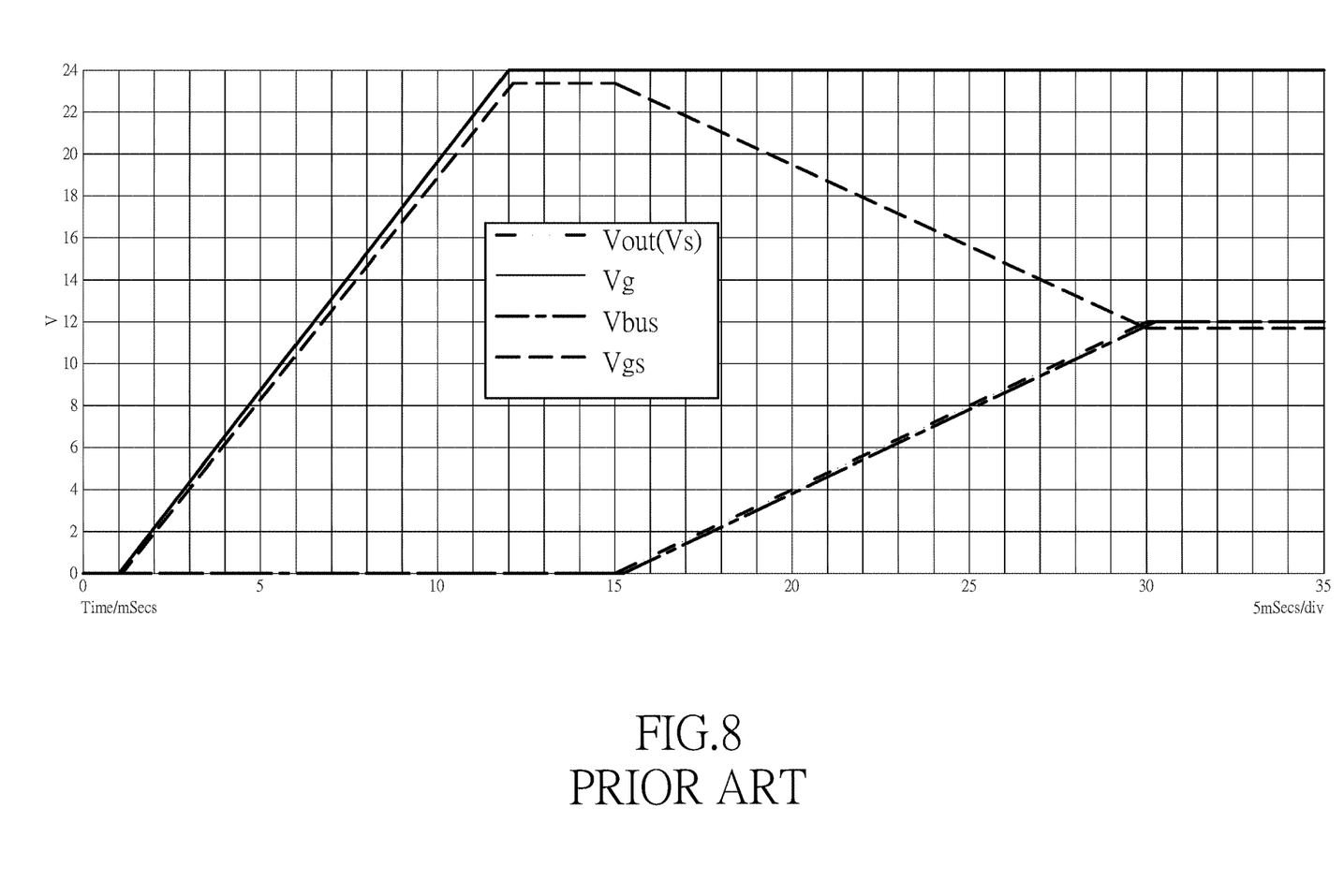
FIG. 8 is a waveform diagram of the conventional power supply.

For example, with reference to FIG. 8, when the conventional power supply is normally working, such as a stage between 30 and 35 microseconds (ms) as shown in FIG. 8, a voltage difference between the gate voltage and the source voltage of the ORing MOSFET unit 23a conventionally is a difference between a voltage of the auxiliary output terminal Vaux and a voltage of the main output terminal Vout. In a normal state, the voltage of the auxiliary output terminal Vaux is 24V, and the voltage of the main output terminal Vout is 12V. Namely, in the normal state, the voltage difference between the gate voltage and the source voltage of the ORing MOSFET unit 23a is 24V−12V=12V.

However, when the conventional power supply is powered, or when a short-circuit protection experiment is performed, the main output terminal Vout of the main power module 21a is grounding, such as a stage between 13 and 15 ms as shown in FIG. 8. Namely, the voltage of the main output terminal Vout will be 0V, but the auxiliary power module works at the normal state. Therefore, the auxiliary output terminal Vaux of the auxiliary power module 22s is powering normally, such that the voltage of the auxiliary output terminal Vaux is 24V. Namely, the voltage difference between the gate voltage and the source voltage of the ORing MOSFET unit 23a exceeds the rated voltage, such as 24V. Accordingly, the ORing MOSFET unit 23a may be easily damaged.

Therefore, the conventional power supply needs to be improved.

SUMMARY OF THE INVENTION

The present invention provides a power supply having ORing MOSFETs. The power supply can control a voltage difference between a gate voltage and a source voltage of one of the ORing MOSFETs to be less than a rated voltage threshold for avoiding damage to the one ORing MOSFET.

The power supply having the ORing MOSFETs includes a rectifying unit, a power converter, an ORing MOSFET unit, a driving unit, and a voltage regulating unit.

The rectifying unit rectifies an alternating current (AC) to a direct current (DC), and outputs the DC. The power converter includes a primary side module, a main power module, and an auxiliary power module. The primary side module is electrically connected to the rectifying unit for receiving the DC. The main power module is coupled with the primary side module to induce a main voltage, and the auxiliary power module is coupled with the primary side module to induce an auxiliary voltage. The main power module further includes a main output terminal and a main ground terminal. The auxiliary power module includes an auxiliary output terminal and an auxiliary ground terminal. The auxiliary ground terminal is electrically connected to the main ground terminal.

The ORing MOSFET unit includes a unit source, a unit gate, and a unit drain. The unit source is electrically connected to the main output terminal of the main power module.

The driving unit includes a first driving input terminal, a second driving input terminal, a driving output terminal, and a voltage control terminal. The first driving input terminal and the second driving input terminal are respectively electrically connected to the unit source and the unit drain of the ORing MOSFET unit. The driving output terminal is electrically connected to the unit gate of the ORing MOSFET unit.

The voltage regulating unit includes a reference voltage input terminal, a regulating input terminal, and a regulating output terminal. The reference voltage input terminal is electrically connected to the main output terminal of the main power module. The regulating input terminal is electrically connected to the auxiliary output terminal of the auxiliary power module. The regulating output terminal is electrically connected to the voltage control terminal of the driving unit. The regulating unit generates a control voltage according to the main voltage and the auxiliary voltage, and outputs the control voltage through the regulating output terminal to control a voltage difference between the gate voltage and the source voltage to be less than the rated voltage threshold through the driving unit.

To sum up, the power supply of the present invention further includes the voltage regulating unit, and the voltage regulating unit regulates the control voltage outputted by the regulating output terminal according to the main voltage received from the reference voltage input terminal. Therefore, a voltage difference between the control voltage and the main voltage can be regulated by the voltage regulating unit. Namely, the control voltage outputted by the regulating output terminal will be regulated according to the main voltage.

Therefore, when the conventional power supply is powered, or when a short-circuit protection experiment is performed, causing the main voltage outputted by the main output terminal to be 0V, the control voltage outputted by the regulating output terminal will be accordingly regulated, such that the voltage difference between the control voltage and the main voltage can be stabilized. For example, the voltage regulating unit can stabilize the voltage difference between the control voltage and the main voltage to be 12V. Therefore, when the main voltage outputted by the main output terminal is 0V, the control voltage outputted by the regulating output terminal will be accordingly regulated as 12V, such that the voltage difference between the gate voltage and the source voltage of the ORing MOSFET unit can be controlled to be less than the rated voltage threshold for avoiding damage.

DETAILED DESCRIPTION OF THE INVENTION

Figure 1:
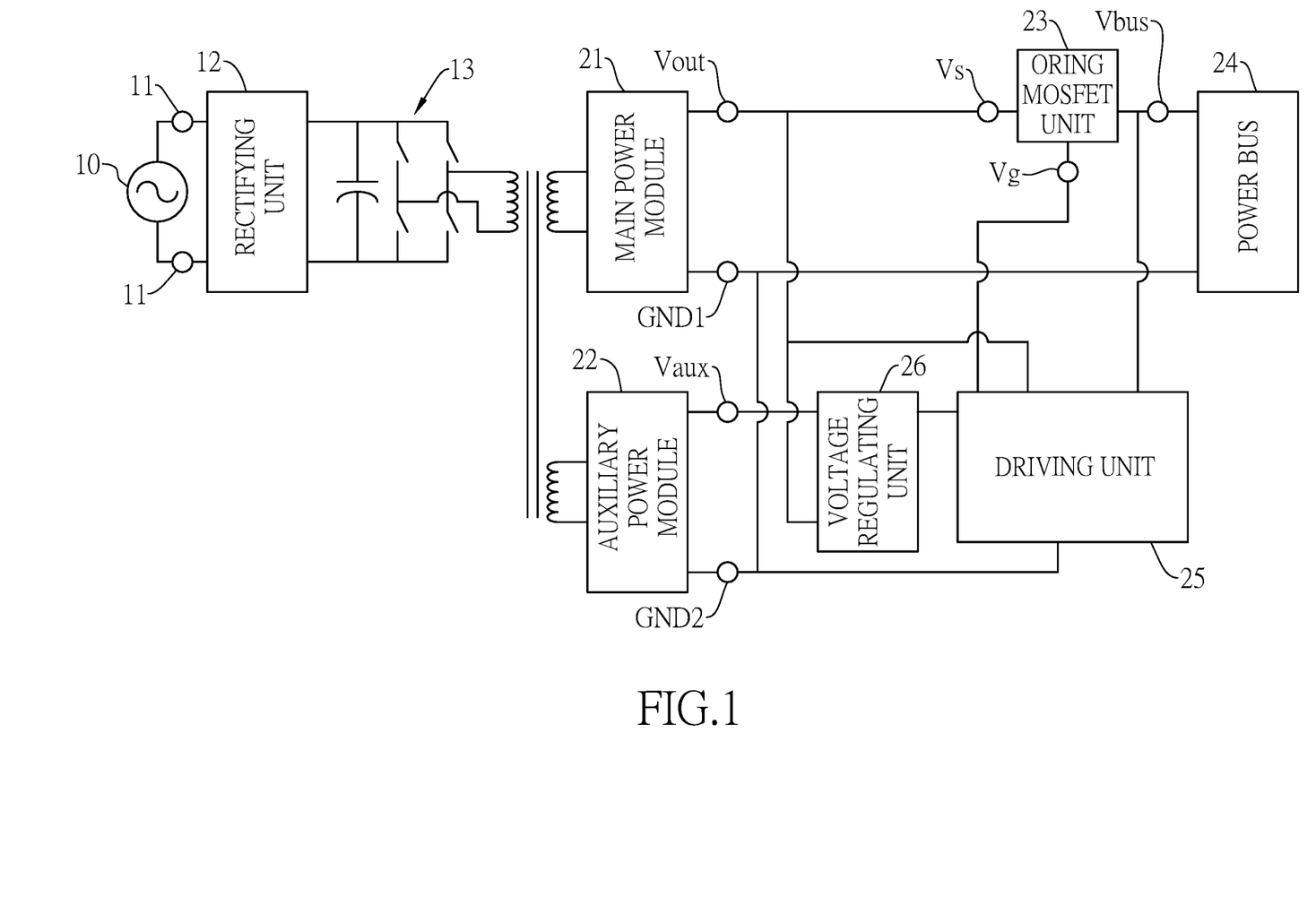
FIG. 1 is a system architecture diagram of a power supply having ORing MOSFETs of the present invention.

With reference to FIG. 1, a power supply having ORing MOSFETs of the present invention includes an input port 11, a rectifying unit 12, a power converter, the ORing MOSFET unit 23, a power bus 24, a driving unit 25, and a voltage regulating unit 26.

The input port 11 is adapted to be electrically connected to a power source 10, for receive an alternating current. The rectifying unit 12 is electrically connected to the input port 11 for receiving the AC, and rectifies the AC to a direct current (DC). The power converter includes a primary side module 13, a main power module 21, and an auxiliary power module 22. The primary side module 13 is electrically connected to the rectifying unit 12 for receiving the DC.

In the embodiment, the input port 11, the regulating unit 12, and the primary side module 13 form a primary side of the power supply, and are same as an architecture of a conventional power supply. Therefore, details of the input port 11, the regulating unit 12, and the primary side module 13 will not be described here.

The main power module 21 is coupled with the primary side module 13 to induce a main voltage, and the auxiliary power module 22 is coupled with the primary side module 13 to induce an auxiliary voltage. The main power module further includes a main output terminal Vout and a main ground terminal GND1, and the main output terminal Vout outputs the main voltage. The auxiliary power module 22 includes an auxiliary output terminal Vaux and an auxiliary ground terminal GND2, and the auxiliary output terminal Vaux outputs the auxiliary voltage. The auxiliary ground terminal is electrically connected to the main ground terminal. Namely, the main power module 21 and the auxiliary power module 22 are common grounding.

In the embodiment, the main power module 21, the auxiliary power module 22, the ORing MOSFET unit 23, the power bus 24, the driving unit 25, and the voltage regulating unit 26 form a secondary side of the power supply.

The main power module 21 and the auxiliary power module 22 are same as the architecture of a conventional power supply. Therefore, details of the main power module 21 and the auxiliary power module 22 will not be described here.

The ORing MOSFET unit 23 includes a unit source Vs, a unit gate Vg, and a unit drain Vbus. The unit source Vs is electrically connected to the main output terminal Vout of the main power module 21 for receiving the main voltage. The power bus 24 is electrically connected to the unit drain Vbus of the ORing MOSFET unit 23 and the main ground terminal GND1 of the main power module 21.

The driving unit 25 includes a first driving input terminal, a second driving input terminal, a driving output terminal, and a voltage control terminal. The first driving input terminal is electrically connected to the unit source Vs of the ORing MOSFET unit 23, and the second driving input terminal is electrically connected to the unit drain Vbus of the ORing MOSFET unit 23. The driving output terminal is electrically connected to the unit gate Vg of the ORing MOSFET unit 23. The driving unit 25 controls a gate voltage of the unit gate Vg according to the source voltage of the unit source Vs, the drain voltage of the unit drain Vbus, and a control voltage of the voltage control terminal.

The voltage regulating unit 26 includes a reference voltage input terminal, a regulating input terminal, and a regulating output terminal. The reference voltage input terminal is electrically connected to the main output terminal Vout of the main power module 21 for receiving the main voltage. The regulating input terminal is electrically connected to the auxiliary output terminal Vaux of the auxiliary power module 22 for receiving the auxiliary voltage. The regulating output terminal is electrically connected to the voltage control terminal of the driving unit 25. The voltage regulating unit 26 generates the control voltage according to the main voltage and the auxiliary voltage, and outputs the control voltage via the regulating output terminal, such that the driving unit 25 can control a voltage difference between the gate voltage and the source voltage to be less than a rated voltage threshold.

Figure 2:
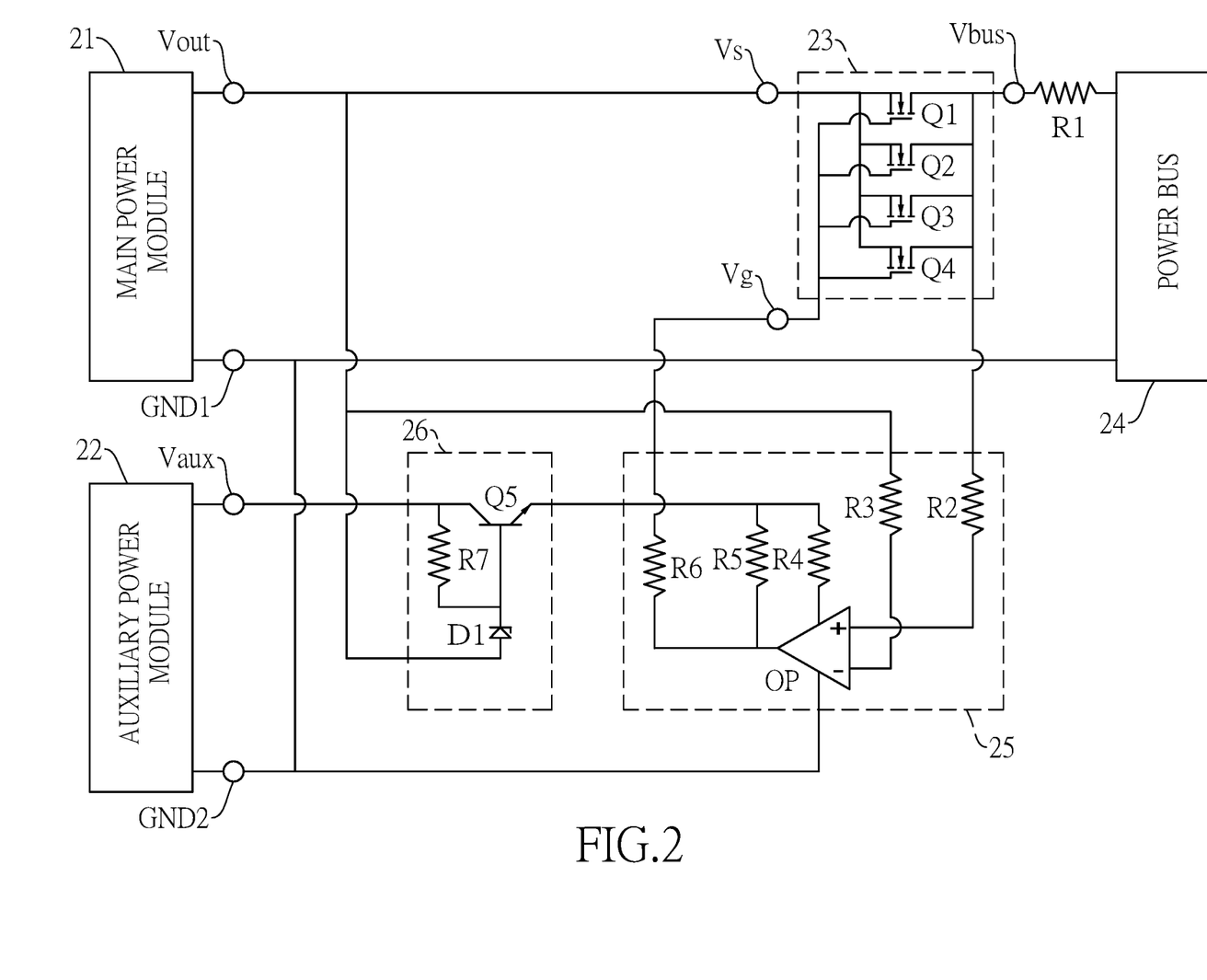
FIG. 2 is a circuit architecture diagram of a first embodiment of a voltage regulating unit of the power supply of the present invention.

Moreover, with reference to FIG. 2, the ORing MOSFET unit 23 further includes a first ORing MOSFET Q1, a second ORing MOSFET Q2, a third ORing MOSFET Q3, and a fourth ORing MOSFET Q4.

The first ORing MOSFET Q1 includes a first source, a first gate, and a first drain. The second ORing MOSFET Q2 includes a second source, a second gate, and a second drain. The third ORing MOSFET Q3 includes a third source, a third gate, and a third drain. The fourth ORing MOSFET Q4 includes a fourth source, a fourth gate, and a fourth drain. The first source, the second source, the third source, and the fourth source are electrically connected together to form the unit source Vs. The first gate, the second gate, the third gate, and the fourth gate are electrically connected together to form the unit gate Vg. The first drain, the second drain, the third drain, and the fourth drain are electrically connected together to form the unit drain Vbus.

The unit drain Vbus of the ORing MOSFET unit 23 is electrically connected to the power bus 24 through a first resistor R1.

The driving unit 25 further includes a comparator OP, a second resistor R2, a third resistor R3, a fourth resistor R4, a fifth resistor R5, and a sixth resistor R6.

The comparator OP includes a positive input terminal, a negative input terminal, a positive power terminal, a negative power terminal, and an output terminal. The positive input terminal is electrically connected to the unit drain Vbus of the ORing MOSFET unit 23 through the second resistor R2. The negative input terminal is electrically connected to the unit source Vs of the ORing MOSFET unit 23 through the third resistor R3. The positive power terminal is electrically connected to the regulating output terminal of the voltage regulating unit 26 through the fourth resistor R4. The negative power terminal is electrically connected to the auxiliary ground terminal GND2. The output terminal is electrically connected to the regulating output terminal of the voltage regulating unit 26 through the fifth resistor R5. The output terminal is further electrically connected to the unit gate Vg of the ORing MOSFET unit 23 through the sixth resistor R6.

In the embodiment, one terminal of the third resistor R3 which is connected to the unit source Vs of the ORing MOSFET unit 23 is the first driving input terminal of the driving unit 25. One terminal of the second resistor R2 which is connected to the unit drain Vbus of the ORing MOSFET unit 23 is the second driving input terminal of the driving unit 25. One terminal of the sixth resistor R6 which is connected to the unit gate Vg of the ORing MOSFET unit 23 is the driving output terminal of the driving unit 25. One terminal of the fifth resistor R5 and one terminal of the sixth resistor R6 which are both connected to the regulating output terminal of the regulating unit 26 are the voltage control terminal of the driving unit 25.

In a first embodiment of the voltage regulating unit 26, the voltage regulating unit 26 includes a transistor Q5, a seventh resistor R7, and a Zener diode D1. The transistor Q5 includes an emitter, a base, and a collector. The emitter is electrically connected to the voltage control terminal of the driving unit 25. The base is electrically connected to the collector through the seventh resistor R7. The collector is further electrically connected to the auxiliary output terminal Vaux of the auxiliary power module 22. The Zener diode D1 includes a first anode and a first cathode. The first anode is electrically connected to the main output terminal Vout of the main power module 21, and the first cathode is electrically connected to the base of the transistor Q5.

In this embodiment, the collector of the transistor Q5 is the regulating input terminal of the voltage regulating unit 26. The first anode of the Zener diode D1 is the reference voltage input terminal of the voltage regulating unit 26. The emitter of the transistor Q5 is the regulating output terminal of the voltage regulating unit 26.

To sum up, the power supply of the present invention further includes the voltage regulating unit 26, and the voltage regulating unit 26 regulates the control voltage outputted by the regulating output terminal according to the main voltage received from the reference voltage input terminal Vout.

Therefore, a voltage difference between the control voltage and the main voltage can be regulated by the voltage regulating unit 26. Namely, the control voltage outputted by the regulating output terminal will be regulated according to the main voltage.

Figure 3:
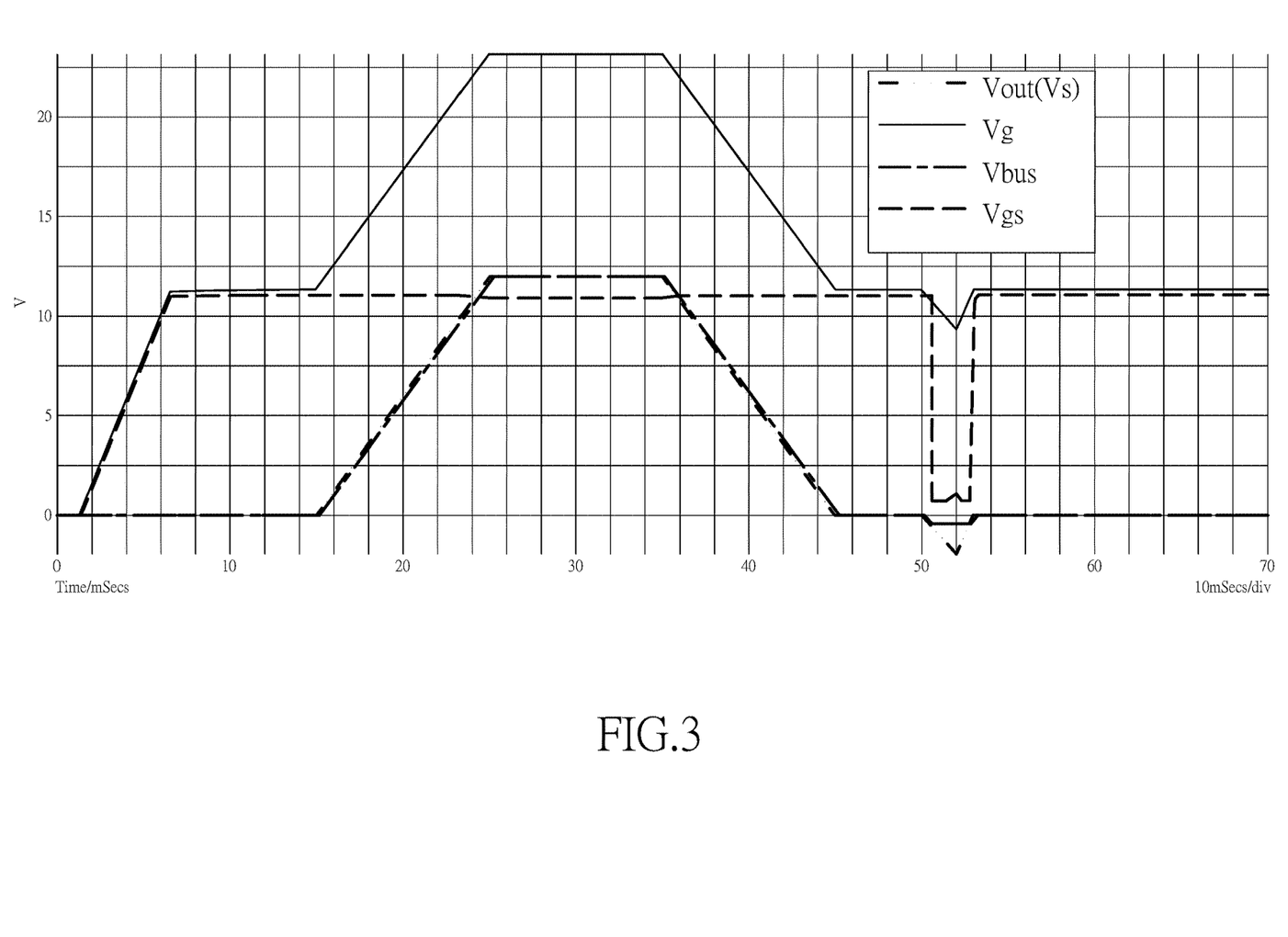
FIG. 3 is a waveform diagram of the power supply of the present invention.

Furthermore, the driving unit 25 controls the gate voltage of the unit gate Vg according to the control voltage. With reference to FIG. 3, when the power supply is powered, or when a short-circuit protection experiment is performed, causing the main voltage outputted by the main output terminal to be 0V, the control voltage outputted by the regulating output terminal will be accordingly regulated, such that the voltage difference between the control voltage and the main voltage can be stabilized. For example, during a stage between 6 and 14 ms as shown in FIG. 3, when the main voltage outputted by the main output terminal is 0V, the control voltage outputted by the regulating output terminal, which is same as the gate voltage of the unit gate Vg, will be regulated to be 12V. Therefore, a voltage difference Vgs between the gate voltage and the main voltage is also 12V, such that the voltage difference between the gate voltage and the source voltage of the ORing MOSFET unit can be controlled to be less than the rated voltage threshold for avoiding damage. Moreover, even when the main power module 21 is abnormal, causing the main voltage outputted by the main output terminal to be a negative voltage, such as a stage between 51 and 53 ms as shown in FIG. 3, the voltage difference Vgs between the gate voltage and the main voltage is still regulated at less than 12V.

Figure 4:
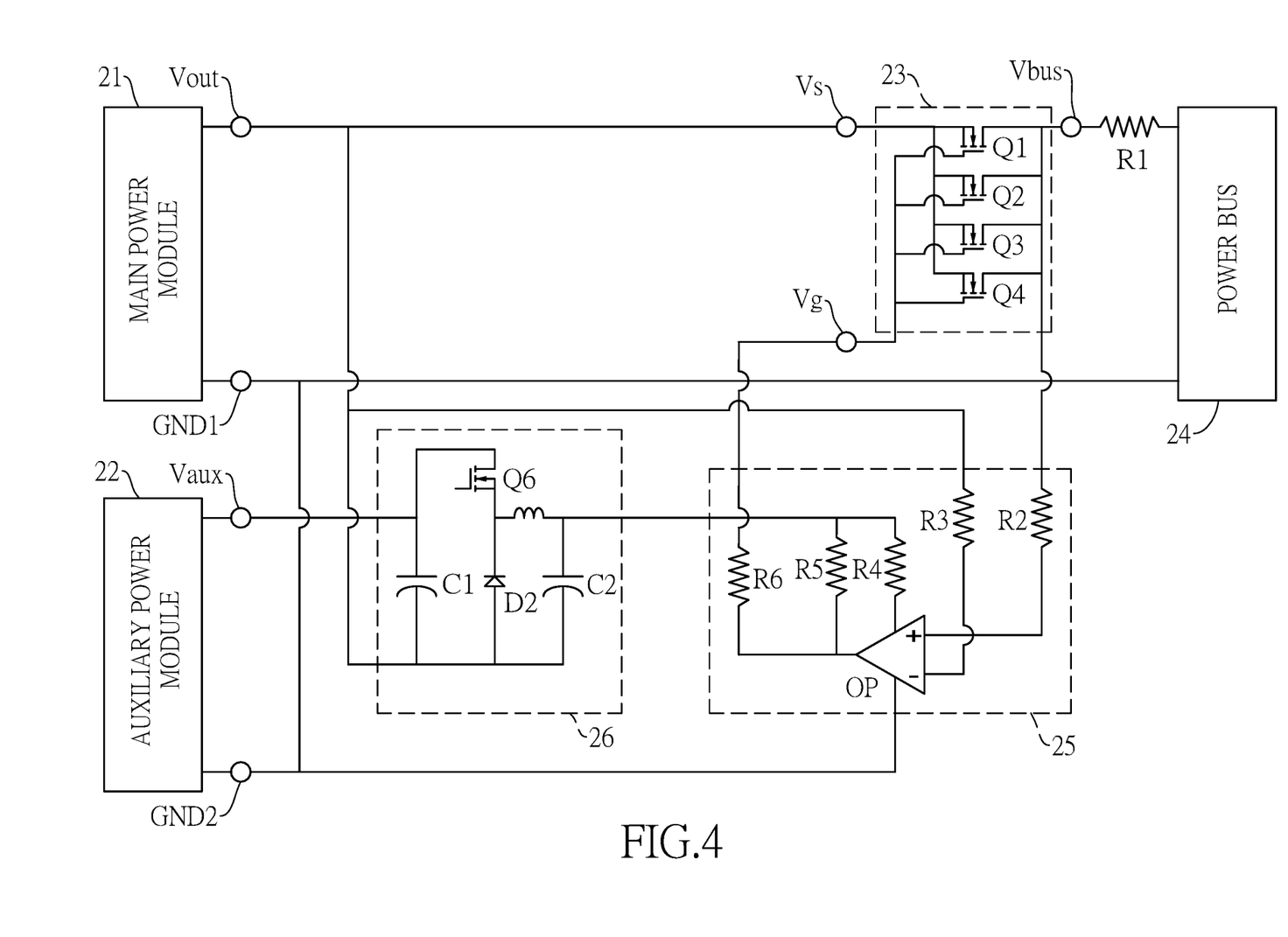
FIG. 4 is a circuit architecture diagram of a second embodiment of the voltage regulating unit of the power supply of the present invention.

With reference to FIG. 4, in a second embodiment of the voltage regulating unit 26, the regulating unit 26 is a buck converter. In this embodiment, the voltage regulating unit 26 includes a buck MOSFET Q6, a buck diode D2, a first capacitor C1, and a second capacitor C2.

The buck MOSFET Q6 includes a sixth source, a sixth gate, and a sixth drain. The sixth drain is electrically connected to the auxiliary output terminal Vaux of the auxiliary power module 22. The sixth source is electrically connected to the voltage control terminal of the driving unit 25. The buck diode D2 includes a second anode and a second cathode. The second anode is electrically connected to the main output terminal Vout of the main power module 21, and the second cathode is electrically connected to the sixth drain of the buck MOSFET Q6. The first capacitor C1 is electrically connected between the auxiliary output terminal Vaux of the auxiliary power module 22 and the main output terminal Vout of the main power module 21. The second capacitor C2 is electrically connected between the sixth drain of the buck MOSFET Q6 and the main output terminal Vout of the main power module 21.

In this embodiment, the sixth drain of the buck MOSFET Q6 is the regulating input terminal of the voltage regulating unit 26. The second anode of the buck diode D2 is the reference voltage input terminal of the voltage regulating unit 26. The sixth source is the regulating output terminal of the voltage regulating unit 26.

Figure 5:
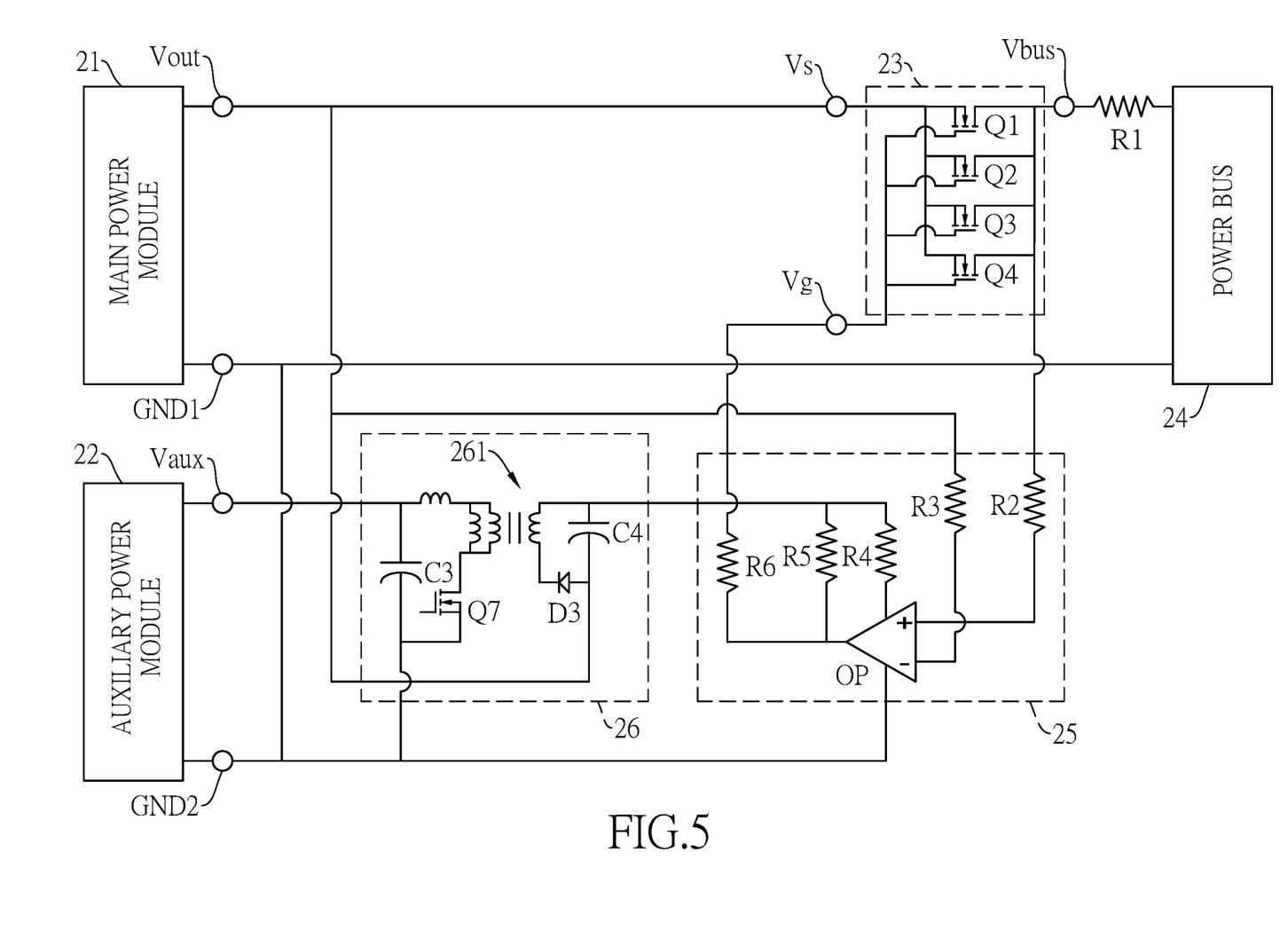
FIG. 5 is a circuit architecture diagram of a third embodiment of the voltage regulating unit of the power supply of the present invention.

With reference to FIG. 5, in a third embodiment of the voltage regulating unit 26, the regulating unit 26 is a flyback converter. In this embodiment, the voltage regulating unit 26 includes a first coupler 261, a flyback MOSFET Q7, a third capacitor C3, a fourth capacitor C4, and a flyback diode D3.

The first coupler 261 includes a first coil and a second coil coupled to each other. The first coil includes a first terminal and a second terminal. The second coil includes a third terminal and a fourth terminal. The third capacitor C3 includes a third positive terminal and a third negative terminal. The third positive terminal is electrically connected to the auxiliary output terminal Vaux of the auxiliary power module 22 and the first terminal of the first coil. The third negative terminal is electrically connected to the auxiliary ground terminal GND2 of the auxiliary power module 22. The flyback MOSFET Q7 includes a seventh source, a seventh gate, and a seventh drain. The seventh drain is electrically connected to the second terminal of the first coil. The seventh source is electrically connected to the third negative terminal of the third capacitor C3. The fourth capacitor C4 includes a fourth positive terminal and a fourth negative terminal. The fourth positive terminal is electrically connected to the voltage control terminal of the driving unit 25 and the third terminal of the second coil. The fourth negative terminal is electrically connected to the main output terminal Vout of the main power module 21. The flyback diode D3 includes a third anode and a third cathode. The third anode is electrically connected to the fourth negative terminal of the fourth capacitor C4. The third cathode is electrically connected to the fourth terminal of the second coil.

In this embodiment, the third positive terminal of the third capacitor C3 is the regulating input terminal of the voltage regulating unit 26. The fourth negative terminal of the fourth capacitor C4 is the reference voltage input terminal of the voltage regulating unit 26. The fourth positive terminal of the fourth capacitor C4 is the regulating output terminal of the voltage regulating unit 26.

Figure 6:
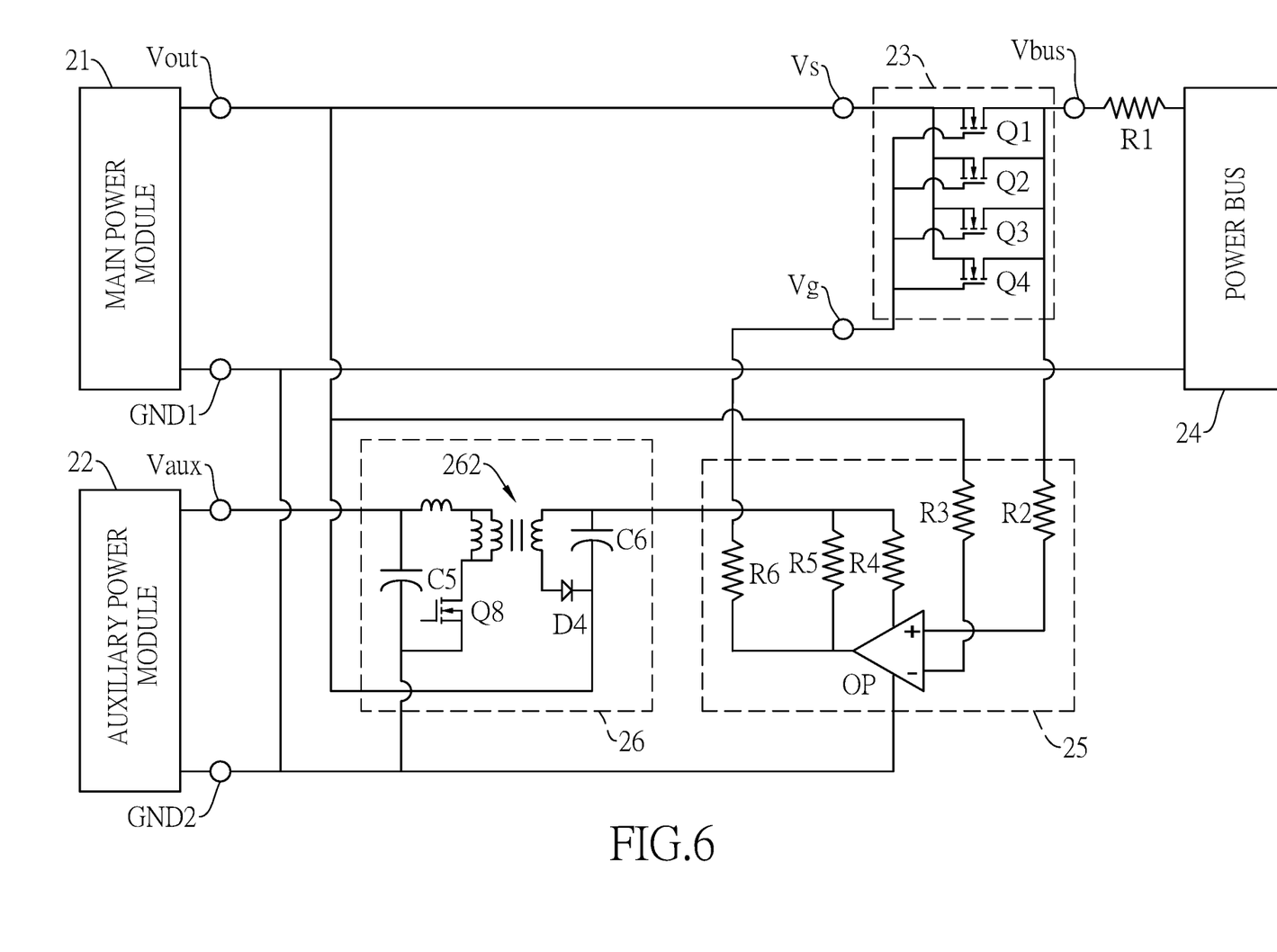
FIG. 6 is a circuit architecture diagram of a fourth embodiment of the voltage regulating unit of the power supply of the present invention.

With reference to FIG. 6, in a fourth embodiment of the voltage regulating unit 26, the voltage regulating unit 26 is a forward converter. In this embodiment, the voltage regulating unit 26 includes a second coupler 262, a forward MOSFET Q8, a fifth capacitor C5, a sixth capacitor C6, and a forward diode D4.

The second coupler 262 includes a third coil and a fourth coil coupled to each other. The third coil includes a fifth terminal and a sixth terminal. The fourth coil includes a seventh terminal and an eighth terminal. The fifth capacitor C5 includes a fifth positive terminal and a fifth negative terminal. The fifth positive terminal is electrically connected to the auxiliary output terminal Vaux of the auxiliary power module 22 and the fifth terminal of the third coil. The fifth negative terminal is electrically connected to the auxiliary ground terminal GND2 of the auxiliary power module 22. The forward MOSFET Q8 includes an eighth source, an eighth gate, and an eighth drain. The eighth drain is electrically connected to the sixth terminal of the third coil. The eighth source is electrically connected to the fifth negative terminal of the fifth capacitor C5. The sixth capacitor C6 includes a sixth positive terminal and a sixth negative terminal. The sixth positive terminal is electrically connected to the voltage control terminal of the driving unit 25 and the seventh terminal of the fourth coil. The sixth negative terminal is electrically connected to the main output terminal Vout of the main power module 21. The forward diode D4 includes a fourth anode and a fourth cathode. The fourth anode is electrically connected to the eighth terminal of the fourth coil. The fourth cathode is electrically connected to the sixth negative terminal of the sixth capacitor C6.

In this embodiment, the fifth positive terminal of the fifth capacitor C5 is the regulating input terminal of the voltage regulating unit 26. The sixth negative terminal of the sixth capacitor C6 is the reference voltage input terminal of the voltage regulating unit 26. The sixth positive terminal of the sixth capacitor C6 is the regulating output terminal of the voltage regulating unit 26.

Even though numerous characteristics and advantages of the present invention have been set forth in the foregoing description, together with details of the structure and function of the invention, the disclosure is illustrative only.

Changes may be made in detail, especially in matters of shape, size, and arrangement of parts within the principles of the invention to the full extent indicated by the broad general meaning of the terms in which the appended claims are expressed.

What is claimed is:

1. A power supply having ORing MOSFETs, comprising:
   a rectifying unit, rectifying an alternating current (AC) to a direct current (DC), and outputting the DC;
   a power converter, comprising:
     a primary side module electrically connected to the rectifying unit for receiving the DC;
     a main power module coupled with the primary side module to induce a main voltage; wherein the main power module comprises a main output terminal and a main ground terminal; and
     an auxiliary power module coupled with the primary side module to induce an auxiliary voltage, wherein the auxiliary power module includes an auxiliary output terminal and an auxiliary ground terminal, and the auxiliary ground terminal is electrically connected to the main ground terminal;
   an ORing MOSFET unit comprising a unit source, a unit gate and a unit drain, wherein the unit source is electrically connected to the main output terminal of the main power module;
   a driving unit, comprising a first driving input terminal, a second driving input terminal, a driving output terminal and a voltage control terminal, wherein the first driving input terminal is electrically connected to the unit source, and the second driving input terminal is electrically connected to the unit drain of the ORing MOSFET unit, wherein the driving output terminal is electrically connected to the unit gate of the ORing MOSFET unit; and a voltage regulating unit comprising a reference voltage input terminal, a regulating input terminal and a regulating output terminal, wherein the reference voltage input terminal is electrically connected to the main output terminal of the main power module, and the regulating input terminal is electrically connected to the auxiliary output terminal of the auxiliary power module, wherein the regulating output terminal is electrically connected to the voltage control terminal of the driving unit;

wherein the voltage regulating unit is configured to generate a control voltage according to the main voltage and the auxiliary voltage and is configured to output the control voltage through the regulating output terminal, such that a voltage difference between a gate voltage and a source voltage is regulated to be less than a rated voltage threshold that is generated by the driving unit;

wherein the unit drain of the ORing MOSFET unit is electrically connected to a power bus through a first resistor; and wherein the voltage regulating unit is a buck converter, and further comprises:

a buck MOSFET, comprising a sixth source, a sixth gate, and a sixth drain; wherein the sixth drain is electrically connected to the auxiliary output terminal of the auxiliary power module, and the sixth source is electrically connected to the voltage control terminal of the driving unit;

a buck diode, comprising a second anode and a second cathode; wherein the second anode is electrically connected to the main output terminal of the main power module, and the second cathode is electrically connected to the sixth source of the buck MOSFET;

a first capacitor, electrically connected between the auxiliary output terminal of the auxiliary power module and the main output terminal of the main power module; and a second capacitor, electrically connected between the sixth source of the buck MOSFET and the main output terminal of the main power module.

2. The power supply as claimed in claim 1, further comprising:

an input port, configured to be electrically connected to a power source, for receiving the AC; wherein the rectifying unit is electrically connected to the input port for receiving the AC, and rectifies the AC to the DC; and the power bus electrically connected to the unit drain of the ORing MOSFET unit and the main ground terminal of the main power module.

3. The power supply as claimed in claim 1, wherein the ORing MOSFET unit further comprises:

a first ORing MOSFET, comprising a first source, a first gate, and a first drain;

a second ORing MOSFET, comprising a second source, a second gate and a second drain;

a third ORing MOSFET, comprising a third source, a third gate and a third drain; and a fourth ORing MOSFET, comprising a fourth source, a fourth gate and a fourth drain;

wherein the first source, the second source, the third source, and the fourth source are electrically connected together to form the unit source;

wherein the first gate, the second gate, the third gate, and the fourth gate are electrically connected together to form the unit gate; and wherein the first drain, the second drain, the third drain, and the fourth drain are electrically connected together to form the unit drain.

4. A power supply having ORing MOSFETs, comprising:

a rectifying unit, rectifying an alternating current (AC) to a direct current (DC), and outputting the DC;

a power converter, comprising:

a primary side module electrically connected to the rectifying unit for receiving the DC;

a main power module coupled with the primary side module to induce a main voltage; wherein the main power module comprises a main output terminal and a main ground terminal; and an auxiliary power module coupled with the primary side module to induce an auxiliary voltage, wherein the auxiliary power module includes an auxiliary output terminal and an auxiliary ground terminal, and the auxiliary ground terminal is electrically connected to the main ground terminal;

an ORing MOSFET unit comprising a unit source, a unit gate and a unit drain, wherein the unit source is electrically connected to the main output terminal of the main power module;

a driving unit, comprising a first driving input terminal, a second driving input terminal, a driving output terminal and a voltage control terminal, wherein the first driving input terminal is electrically connected to the unit source, and the second driving input terminal is electrically connected to the unit drain of the ORing MOSFET unit, wherein the driving output terminal is electrically connected to the unit gate of the ORing MOSFET unit; and a voltage regulating unit comprising a reference voltage input terminal, a regulating input terminal and a regulating output terminal, wherein the reference voltage input terminal is electrically connected to the main output terminal of the main power module, and the regulating input terminal is electrically connected to the auxiliary output terminal of the auxiliary power module, wherein the regulating output terminal is electrically connected to the voltage control terminal of the driving unit;

wherein the voltage regulating unit is configured to generate a control voltage according to the main voltage and the auxiliary voltage and is configured to output the control voltage through the regulating output terminal, such that a voltage difference between a gate voltage and a source voltage is regulated to be less than a rated voltage threshold that is generated by the driving unit;

wherein the driving unit further comprises:

a comparator, comprising a positive input terminal, a negative input terminal, a positive power terminal, a negative power terminal and an output terminal;

wherein the positive input terminal is electrically connected to the unit drain of the ORing MOSFET unit through a second resistor;

wherein the negative input terminal is electrically connected to the unit source of the ORing MOSFET unit through a third resistor;

wherein the positive power terminal is electrically connected to the regulating output terminal of the voltage regulating unit through a fourth resistor;

wherein the negative power terminal is electrically connected to the auxiliary ground terminal; wherein the output terminal is electrically connected to the regulating output terminal of the voltage regulating unit through a fifth resistor, and the output terminal further is electrically connected to the unit gate of the ORing MOSFET unit through a sixth resistor; and wherein the voltage regulating unit further comprises:

a transistor, comprising an emitter, a base, and a collector; wherein the emitter is electrically connected to the voltage control terminal of the driving unit, the base is electrically connected to the collector through a seventh resistor, and the collector is further electrically connected to the auxiliary output terminal of the auxiliary power module; and a Zener diode, comprising a first anode and a first cathode; wherein the first anode is electrically connected to the main output terminal of the main power module, and the first cathode is electrically connected to the base of the transistor.

5. A power supply having ORing MOSFETs, comprising:

a rectifying unit, rectifying an alternating current (AC) to a direct current (DC), and outputting the DC;

a power converter, comprising:
  a primary side module electrically connected to the rectifying unit for receiving the DC;
  a main power module coupled with the primary side module to induce a main voltage; wherein the main power module comprises a main output terminal and a main ground terminal; and
  an auxiliary power module coupled with the primary side module to induce an auxiliary voltage, wherein the auxiliary power module includes an auxiliary output terminal and an auxiliary ground terminal, and the auxiliary ground terminal is electrically connected to the main ground terminal;

an ORing MOSFET unit comprising a unit source, a unit gate and a unit drain, wherein the unit source is electrically connected to the main output terminal of the main power module;

a driving unit, comprising a first driving input terminal, a second driving input terminal, a driving output terminal and a voltage control terminal, wherein the first driving input terminal is electrically connected to the unit source, and the second driving input terminal is electrically connected to the unit drain of the ORing MOSFET unit, wherein the driving output terminal is electrically connected to the unit gate of the ORing MOSFET unit; and a voltage regulating unit comprising a reference voltage input terminal, a regulating input terminal and a regulating output terminal, wherein the reference voltage input terminal is electrically connected to the main output terminal of the main power module, and the regulating input terminal is electrically connected to the auxiliary output terminal of the auxiliary power module, wherein the regulating output terminal is electrically connected to the voltage control terminal of the driving unit;

wherein the voltage regulating unit is configured to generate a control voltage according to the main voltage and the auxiliary voltage and is configured to output the control voltage through the regulating output terminal, such that a voltage difference between a gate voltage and a source voltage is regulated to be less than a rated voltage threshold that is generated by the driving unit; and wherein the voltage regulating unit is a flyback converter, and further comprises:

a first coupler, comprising a first coil and a second coil coupled to each other; wherein the first coil includes a first terminal and a second terminal; wherein the second coil includes a third terminal and a fourth terminal;

a third capacitor, comprising a third positive terminal and a third negative terminal; wherein the third positive terminal is electrically connected to the auxiliary output terminal of the auxiliary power module and the first terminal of the first coil; wherein the third negative terminal is electrically connected to the auxiliary ground terminal of the auxiliary power module;

a flyback MOSFET, comprising a seventh source, a seventh gate, and a seventh drain; wherein the seventh drain is electrically connected to the second terminal of the first coil, and the seventh source is electrically connected to the third negative terminal of the third capacitor;

a fourth capacitor, comprising a fourth positive terminal and a fourth negative terminal; wherein the fourth positive terminal is electrically connected to the voltage control terminal of the driving unit and the third terminal of the second coil, and the fourth negative terminal is electrically connected to the main output terminal of the main power module; and a flyback diode, comprising a third anode and a third cathode; wherein the third anode is electrically connected to the fourth negative terminal of the fourth capacitor, and the third cathode is electrically connected to the fourth terminal of the second coil.

6. A power supply having ORing MOSFETs, comprising:

a rectifying unit, rectifying an alternating current (AC) to a direct current (DC), and outputting the DC;

a power converter, comprising:
  a primary side module electrically connected to the rectifying unit for receiving the DC;
  a main power module coupled with the primary side module to induce a main voltage; wherein the main power module comprises a main output terminal and a main ground terminal; and
  an auxiliary power module coupled with the primary side module to induce an auxiliary voltage, wherein the auxiliary power module includes an auxiliary output terminal and an auxiliary ground terminal, and the auxiliary ground terminal is electrically connected to the main ground terminal;

an ORing MOSFET unit comprising a unit source, a unit gate and a unit drain, wherein the unit source is electrically connected to the main output terminal of the main power module;

a driving unit, comprising a first driving input terminal, a second driving input terminal, a driving output terminal and a voltage control terminal, wherein the first driving input terminal is electrically connected to the unit source, and the second driving input terminal is electrically connected to the unit drain of the ORing MOSFET unit, wherein the driving output terminal is electrically connected to the unit gate of the ORing MOSFET unit; and a voltage regulating unit comprising a reference voltage input terminal, a regulating input terminal and a regulating output terminal, wherein the reference voltage input terminal is electrically connected to the main output terminal of the main power module, and the regulating input terminal is electrically connected to the auxiliary output terminal of the auxiliary power module, wherein the regulating output terminal is electrically connected to the voltage control terminal of the driving unit;

wherein the voltage regulating unit is configured to generate a control voltage according to the main voltage and the auxiliary voltage and is configured to output the control voltage through the regulating output terminal, such that a voltage difference between a gate voltage and a source voltage is regulated to be less than a rated voltage threshold that is generated by the driving unit; and wherein the voltage regulating unit is a forward converter and further comprises:

a second coupler, comprising a third coil and a fourth coil coupled to each other; wherein the third coil includes a fifth terminal and a sixth terminal; wherein the fourth coil includes a seventh terminal and an eighth terminal;

a fifth capacitor, comprising a fifth positive terminal and a fifth negative terminal; wherein the fifth positive terminal is electrically connected to the auxiliary output terminal of the auxiliary power module and the fifth terminal of the third coil, and the fifth negative terminal is electrically connected to the auxiliary ground terminal of the auxiliary power module;

a forward MOSFET, comprising an eighth source, an eighth gate, and an eighth drain; wherein the eighth drain is electrically connected to the sixth terminal of the third coil, and the eighth source is electrically connected to the fifth negative terminal of the fifth capacitor;

a sixth capacitor, comprising a sixth positive terminal and a sixth negative terminal; wherein the sixth positive terminal is electrically connected to the voltage control terminal of the driving unit and the seventh terminal of the fourth coil, and the sixth negative terminal is electrically connected to the main output terminal of the main power module; and a forward diode, comprising a fourth anode and a fourth cathode; wherein the fourth anode is electrically connected to the eighth terminal of the fourth coil, and the fourth cathode is electrically connected to the sixth negative terminal of the sixth capacitor.

\* \* \* \* \*